United States Patent [19]

Butenop et al.

[11] Patent Number: 5,050,814
[45] Date of Patent: Sep. 24, 1991

[54] SAFETY BELT REELING MECHANISM

[75] Inventors: Klaus Butenop, Herzhorn; Doris Kröger, Tornesch, both of Fed. Rep. of Germany

[73] Assignee: Autoflug GmbH & Co. Fahrzeugtechnik, Rellingen, Fed. Rep. of Germany

[21] Appl. No.: 475,647

[22] Filed: Feb. 2, 1990

[30] Foreign Application Priority Data

Feb. 2, 1989 [DE] Fed. Rep. of Germany ....... 3903148

[51] Int. Cl.$^5$ ............................................. B60R 22/46
[52] U.S. Cl. .................................................... 242/107
[58] Field of Search ......... 242/107, 107.4 R, 107.4 E; 280/806; 297/478, 480

[56] References Cited

U.S. PATENT DOCUMENTS 4,558,832 12/1985 Nilsson ................................ 242/107
4,618,108 10/1986 Butenop et al. ..................... 242/107

FOREIGN PATENT DOCUMENTS 3140270 4/1983 Fed. Rep. of Germany ... 242/107.4 R

Primary Examiner—John M. Jillions
Attorney, Agent, or Firm—Robert W. Becker & Associates

[57] ABSTRACT

Safety belt reeling means with a tightening device comprising a drive which is activated in the event of an incident is provided. The drive is spaced from a belt winding spindle of the belt reeling means and is connectable thereto via a coupling in the event of actuation of the drive. The coupling comprises a first coupling member which is mounted on a driven disc so as to be capable of movement, in the event of rotation of the disc, to engage with a second coupling member connected to the belt winding spindle, the driven disc being constructed as an inertia disc which is adapted to be set in rotation by the drive. Preferably the drive is a piston/cylinder unit which transmits a rotary motion to the inertia disc via a piston rod and a crank pin.

6 Claims, 3 Drawing Sheets

FIG—1

SAFETY BELT REELING MECHANISM

BACKGROUND OF THE INVENTION

The invention relates to safety belt reeling means with a tightening device.

Belt reeling means have been proposed which comprise a drive which is activated in the event of an incident, the drive being spaced from a belt winding spindle of the belt reeling means and connectable thereto by means of a coupling in the event of actuation, a locking member eccentrically mounted on a driven disc, and capable of pivoting radially outwards in the event of actuation to engage with the teeth of a coupling member connected to the belt winding spindle.

Safety belt reeling means of this kind are described in applicant's U.S. Pat. No. 4,618,108 according to this publication, the drive mechanism for the belt winding spindle consists of a cable drive, wherein a cable wound on a cable reel is pulled off the cable reel by the linear movement of a piston connected to the cable in a cylinder and as a result the cable reel is set in rotation. The cable reel is coupled to the belt winding spindle by means of a locking member which is mounted on the cable reel and capable o pivoting radially outwards as a result of the inertia forces acting on it, said locking member coming into engagement with the teeth on a coupling disc integral with the spindle, as a result of which a connection is established which transmits force and torque between the cable reel and the belt winding spindle.

This known arrangement has the disadvantage that throughout the entire tightening movement determined by the rotation of the cable reel, drive energy must continue to be supplied to the piston since, if the drive energy were to be reduced or used up, the piston would no longer cause the cable reel to rotate, with the result that the tightening action described above, with the winding of a given length of belt onto the belt winding spindle, would not be achieved. The disadvantage of this is that the drive for the cable reel has to be comparatively large in construction since it is necessary to provide a path of travel for the piston which corresponds to the retraction of the belt in the region of the drive.

It is therefore an object of the present invention to improve a safety belt reeling mechanism of the aforementioned general type in such a way as to reduce the dimensions of the drive for achieving the tightening action.

SUMMARY OF THE INVENTION

According to the invention there is provided safety belt reeling means with a tightening device comprising a drive which is activated in the event of an incident, said drive being spaced from a belt winding spindle of the belt reeling means and connectable thereto via a coupling in the event of actuation of the drive, the coupling comprising a first coupling member mounted on a driven disc so as to be capable of moving, in the event of rotation of the disc, to engage with a second coupling member connected to the belt winding spindle, the disc being constructed as an inertia disc which is adapted to be set in rotation by the drive.

The invention, at least in preferred embodiments, has the advantage that the inertia disc now only need be supplied over a short travel with sufficient kinetic energy to ensure that the inertia disc continues to rotate even when the drive energy is reduced or lost altogether and will consequently ensure that the belt is retracted into the belt reeling means over a suitable tightening distance of, for example, 100 to 140 mm. Furthermore the dimensions at the drive end required for achieving the tightening movement may be reduced.

A preferred embodiment of the invention envisages the drive as a gas pressure-operated cylinder-piston unit with the piston being connected to the inertia disc via a piston rod, so that the linear movement of the piston is converted into a rotary movement of the inertia disc. The advantage of this is that the path of travel of the piston can be arranged to overlap the inertia disc, preferably extending over the diameter of the inertia disc, thus resulting in small dimensions for the drive mechanism. In this connection, it is proposed according to one embodiment of the invention, that the piston rod should act on a crank pin provided on the inertia disc, the crank pin being offset with respect to the top dead center of the piston by a few degrees in the direction of rotation of the inertia disc when said disc is in its rest position. The crank pin may be arranged on the inertia disc at a smaller radius relative to the center of the inertia disc than the outer radius of the disc, which will also reduce the necessary travel of the piston by means of which the inertia disc is to be set in rotation.

In a particularly preferred embodiment the inertia disc is driven via the piston over a rotation angle of about 180°, the mass of the inertia disc being selected such that the inertia disc will continue to execute a complete rotation even after the piston has reached its bottom dead center position, and the belt winding spindle will continue rotating accordingly and thus ensure the necessary tightening movement.

Preferably, the piston cylinder contains relief bores in the cylinder wall above the bottom dead center position of the piston, through which the residual gas may flow away after the piston has reached bottom dead center, so that the upward movement imparted to the piston by the continuing rotation of the fly-wheel is not opposed by any resistance in the cylinder.

The invention is not restricted to the preferred method of driving the fly-wheel by means of a crank transmission; rather piston may set the inertia disc rotating over a correspondingly short distance by, for example, means of a drive cable, the drive energy once again acting only over a drive distance which is greatly reduced compared with the tightening distance.

BRIEF DESCRIPTION OF THE DRAWINGS

An embodiment of the invention will now be described, by way of example only, with reference to the following drawings in which.

DESCRIPTION OF THE PREFERRED EMBODIMENTS

Figure 1:
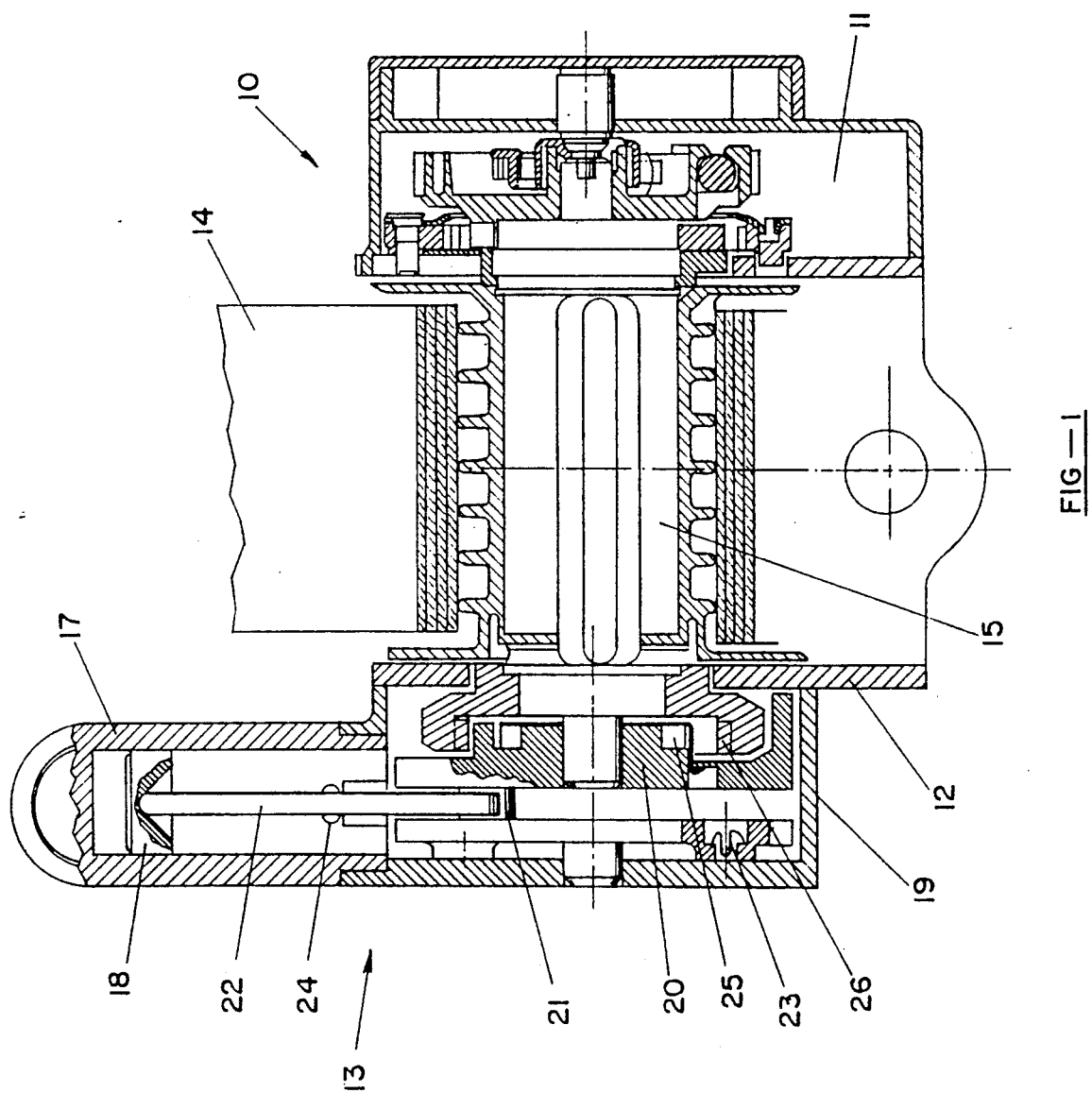
FIG. 1 shows a longitudinal section through belt reeling means with a tightening device according to the invention.

The belt reeling means 10 comprise, on the side opposite the so-called system end 11 with the belt sensitive and vehicle sensitive blocking mechanism, a drive mechanism 13 arranged on the arm 12 of a housing, for tightening the belt 14 by winding it onto the belt winding spindle 15. The system end 11 does not form part of the present invention; consequently, no further details will be given of the construction thereof and the operation of the individual parts belonging to it.

The drive mechanism 13 has, first of all, a gas generator 16 connected to a cylinder 17 with a piston 18 guided therein. Rotatably mounted on a drive housing 19, which is fixedly connected to the arm 12 of the housing of the belt reeling means 10, is a solid inertia disc 20 which has on its outwardly situated surface a crank pin 21 on which a piston rod 22 connected to the piston 18 engages. In its rest position the inertia disc 20 is secured on the drive housing 19 by means of shear pins 23 in such a way that the crank pin 21 is offset with respect to the top dead center position of the piston 18 by a few degrees in the intended direction of rotation of the inertia disc 20.

Figure 2:
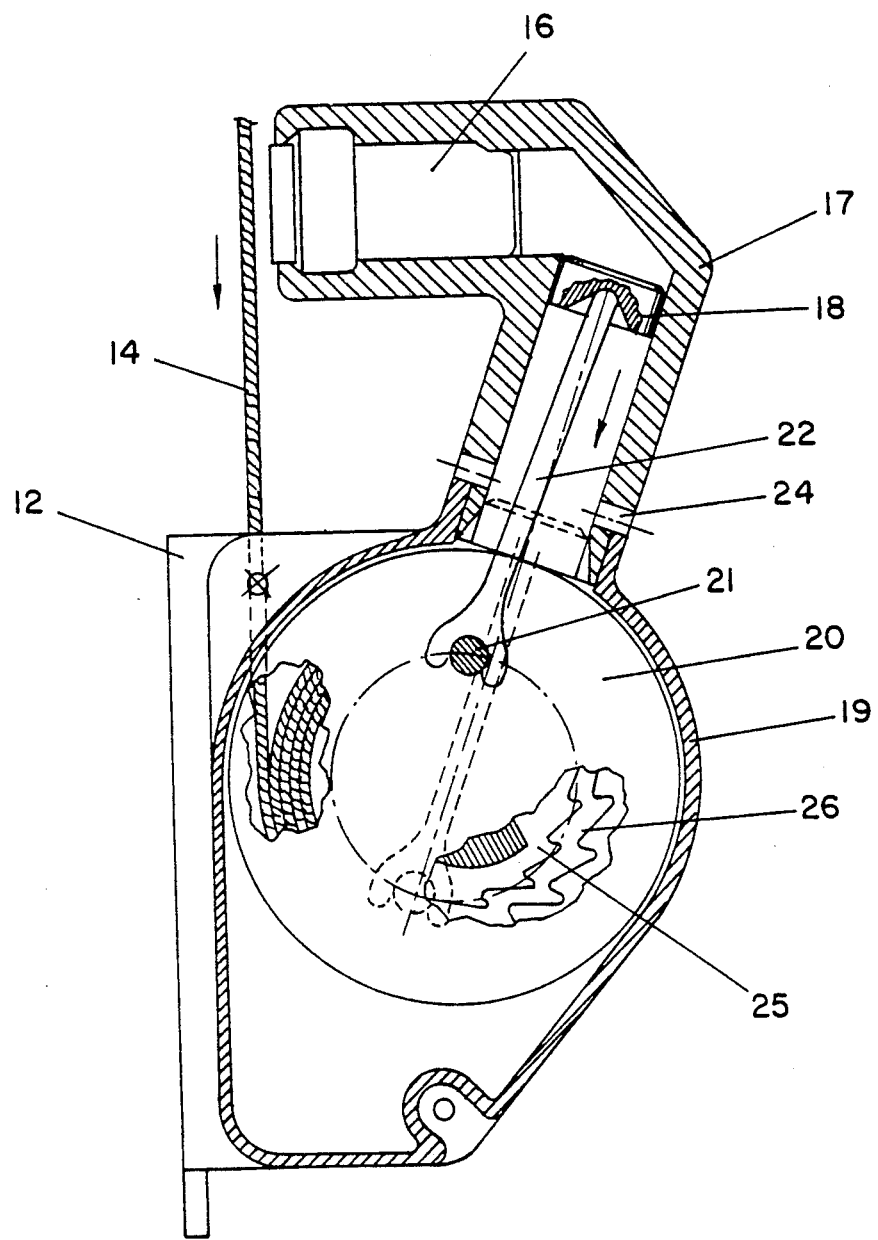
FIG. 2 shows the drive end of the belt reeling means of FIG. 1 in cross section.
Figure 3:
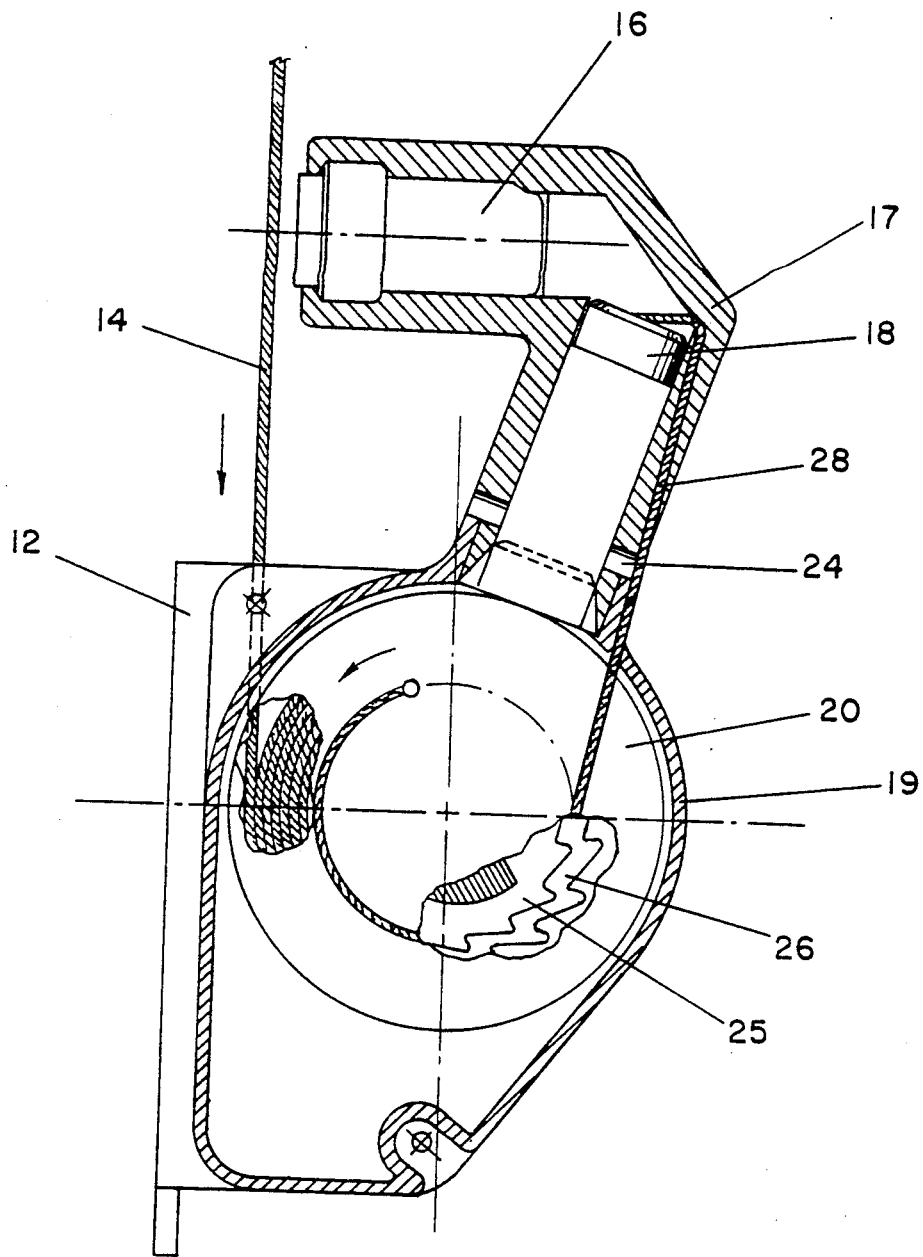

As can be seen from FIG. 2 in particular, relief bores 24 are provided in the cylinder 17 above the bottom dead center position of the piston 18.

FIG. 1 also shows a partial view of a locking member 25 mounted on the side of the inertia disc 20 facing the belt winding spindle 15, as well as the teeth 26 interacting therewith, which are in turn formed on a component connected to the belt winding spindle 15. The coupling interaction of these components is described in the aforementioned U.S. Pat. No. 4,618,108.

The preferred embodiment described above operates as follows: after the gas generator 16 has been actuated, preferably electrically, the gases flowing out of it drive the piston 18 downwards in the cylinder housing 17 from the top dead center position shown in FIG. 1; by this linear movement of the piston 18, the inertia disc 20 is set in rotation via the piston rod 22 and the crank pin 21 and is driven counter to the direction of withdrawal of the belt. The inertia disc 20 is released from the drive housing 19 at the shear pins 23 as said disc 20 begins to rotate.

The inertia disc 20 is driven by the piston 18 and piston rod 22 over a rotation angle of about 180° until the piston 18 reaches its bottom dead center position in the cylinder housing 17; in this position, as shown in FIG. 2, relief bores 24 are exposed through which the excess gas can escape from the cylinder housing 17 so that during the movement of the piston 18 towards its top dead center position, produced by the continued, inertial rotation of the inertia disc 20, there is no opposing pressure caused by any excess gas.

The abrupt start of rotation of the inertia disc 20 causes the locking member 25 mounted on the inertia disc and spring-biased into its rest position to be radially deflected into the inner teeth 26 of a component connected to the belt winding spindle 15, with the result that, through this coupling connection, the rotary movement of the inertia disc 20 is converted into a rotary movement of the belt winding spindle 15 in the same direction. As a result of the kinetic energy of the inertia disc 20 the latter continues to rotate for one more complete revolution, beyond the drive range of about 180°, thus achieving the necessary tightening movement in relation to the belt 14.

The invention is not restricted to the embodiment shown; by a different arrangement of the gas generator and drive cylinder the dimensions of the drive mechanism 13 can be reduced still further; other alternative methods of initially causing the inertia disc 20 to rotate also fall within the scope of the invention; for example, a turbine-like arrangement of the inertia disc or the transmission of the rotation energy through a cable drive can be envisaged, within the latter case, only a short length of cable having to be wound on the inertia disc 20.

The present invention is, of course, in no way restricted to the specific disclosure of the specification and drawings, but also encompasses any modifications within the scope of the appended claims.

What we claim is:

1. In a safety belt reeling means having a tightening device comprising a drive that is activated in the event of an incident, with said drive being spaced from a belt winding spindle of said belt reeling means and being connectable thereto, in the event of actuation of said drive, via coupling means that comprises a first coupling member, which is mounted on a driven disc and in the event of rotation of said disc is adapted to engage a second coupling member which is connected to said belt winding spindle, the improvement wherein:

said driven disc is in the form of an inertia disc that is rotatable via said drive, and said drive comprises a gas pressure-operated cylinder/piston unit, with said piston being connected to said inertia disc via a piston rod.

2. A safety belt reeling means according to claim 1, in which said piston rod acts on a crank pin that is disposed on said inertia disc in such a way that when said disc is in a rest position, said crank pin is offset a few degrees with respect to a top dead center position of said piston in the direction of rotation of said inertia disc.

3. A safety belt reeling means according to claim 2, in which said crank pin is disposed on said inertia disc at a lesser radius from a center of said disc than an outer radius thereof.

4. A safety belt reeling means according to claim 2, in which a travel of said piston between a top and bottom dead center position corresponds to a rotational angle of said crank pin of 180°.

5. A safety belt reeling means according to claim 2, in which said cylinder has a wall in which are provided relief bores that are disposed above a bottom dead center position of said piston.

6. A safety belt reeling means according to claim 2, which includes a housing for said drive, with said inertia disc being secured in a rest position relative to said housing via shear elements.

* * * * *